(12) United States Patent
Ma et al.

(10) Patent No.: US 11,740,025 B2
(45) Date of Patent: Aug. 29, 2023

(54) FLUIDIZED-BED HEAT EXCHANGER FOR CONVERSION OF THERMAL ENERGY TO ELECTRICITY

(71) Applicants: Alliance for Sustainable Energy, LLC, Golden, CO (US); Colorado School of Mines, Golden, CO (US)

(72) Inventors: Zhiwen Ma, Golden, CO (US); Jeffrey Clayton Gifford, Denver, CO (US); Patrick Gordon Davenport, Boulder, CO (US); Xingchao Wang, Highlands Ranch, CO (US)

(73) Assignees: Alliance for Sustainable Energy, LLC, Golden, CO (US); Colorado School of Mines, Golden, CO (US)

( * ) Notice: Subject to any disclaimer, the term of this patent is extended or adjusted under 35 U.S.C. 154(b) by 0 days.

(21) Appl. No.: 17/376,367

(22) Filed: Jul. 15, 2021

(65) Prior Publication Data

US 2022/0018603 A1    Jan. 20, 2022

Related U.S. Application Data

(60) Provisional application No. 63/052,128, filed on Jul. 15, 2020.

(51) Int. Cl.
   *F28C 3/16* (2006.01)
   *F28D 20/00* (2006.01)
   *F02C 1/04* (2006.01)

(52) U.S. Cl.
   CPC ............... *F28C 3/16* (2013.01); *F02C 1/04* (2013.01); *F28D 20/0056* (2013.01);
   (Continued)

(58) Field of Classification Search
   CPC .......... F28C 3/16; F02C 1/04; F28D 20/0056; F28D 2020/0069; F28D 2020/0078; F05D 2220/32; F05D 2220/76
   See application file for complete search history.

(56) References Cited

U.S. PATENT DOCUMENTS 3,850,231 A   11/1974   Creek
4,377,066 A    3/1983   Dickinson
(Continued)

FOREIGN PATENT DOCUMENTS

WO    2020068758 A1    4/2020

OTHER PUBLICATIONS

"Energy Storages Are Essential in the Energy Systems of the Future", available at https://polarnightenergy.fi/solutions, accessed on Jul. 13, 2022, pp. 1-5.
(Continued)

*Primary Examiner* — Shafiq Mian
(74) *Attorney, Agent, or Firm* — Alexandra M. Hall; Michael A. McIntyre

(57) ABSTRACT

The present disclosure describes heat exchangers for converting thermal energy stored in solid particles to electricity. Electro-thermal energy storage converts off-peak electricity into heat for thermal energy storage, which may be converted back to electricity, for example during peak-hour power generation. The heat exchanger for converting thermal energy stored in solid particles to electricity enables the conversion of thermal energy into electrical energy for redistribution to the grid. In some embodiments, pressurized fluidized-bed heat exchangers may achieve efficient conversion of thermal energy to electricity by providing direct contact of the solid particles with a gas stream.

17 Claims, 15 Drawing Sheets

(52) U.S. Cl.
CPC ...... *F05D 2220/32* (2013.01); *F05D 2220/76* (2013.01); *F28D 2020/0069* (2013.01); *F28D 2020/0078* (2013.01)

(56) References Cited

U.S. PATENT DOCUMENTS

| | | | |
|---|---|---|---|
| 4,476,674 | A | 10/1984 | Berman |
| 4,530,207 | A | 7/1985 | Brännström |
| 4,532,108 | A | 7/1985 | Becht, IV |
| 4,539,940 | A | 9/1985 | Young |
| 5,027,893 | A | 7/1991 | Cetinkaya et al. |
| 5,570,645 | A | 11/1996 | Garcia-Mallol |
| 6,007,869 | A | 12/1999 | Schreieder et al. |
| 6,145,547 | A | 11/2000 | Villatte |
| 8,821,827 | B2 | 9/2014 | Kim et al. |
| 9,108,808 | B2 | 8/2015 | Furuyama et al. |
| 9,347,690 | B2 | 5/2016 | Ma |
| 9,458,838 | B2 | 10/2016 | Sakadjian et al. |
| 9,829,217 | B2 * | 11/2017 | Maryamchik ........... F03G 6/067 |
| 2006/0267340 | A1 * | 11/2006 | Galatello Adamo ... F28D 7/106 285/288.1 |
| 2012/0000175 | A1 | 1/2012 | Wormser |
| 2013/0257056 | A1 * | 10/2013 | Ma ...................... F28D 20/0056 126/714 |
| 2013/0284163 | A1 * | 10/2013 | Flamant .................. F22B 1/006 126/714 |
| 2014/0311479 | A1 * | 10/2014 | Maryamchik ........... F03G 6/067 126/714 |
| 2015/0011811 | A1 | 1/2015 | Pavone et al. |
| 2019/0070551 | A1 * | 3/2019 | Baxter ..................... F28B 5/00 |
| 2020/0124356 | A1 | 4/2020 | Ma et al. |
| 2020/0149825 | A1 * | 5/2020 | Liu ......................... F28D 19/02 |
| 2022/0146205 | A1 | 5/2022 | Eronen et al. |

OTHER PUBLICATIONS

"Store Wind and Solar Power as Heat in Sand", available at https://polarnightenergy.fi/technology, accessed on Jul. 13, 2022, pp. 1-6.

International Search Report & Written Opinion for PCT Application No. PCT/US21/41732, dated Dec. 16, 2021, pp. 1-12.

"How a PFBC System Works", PFBC Enviromental Energy Technology Inc., 2018, available at http://www.pfbceet.com/our-technology/how-a-pfbc-system-works/, accessed on Oct. 26, 2021, pp. 1-3.

"Tidd PFBC Demonstration Project—A DOE Assessment", DOE/NETL-2001/1159, Technical Report, Aug. 2001, pp. 1-36.

Gifford et al., "Thermal analysis of insulation design for a thermal energy storage silo long-duration electricity storage", Frontiers in Energy Research, Jun. 2020, vol. 8, No. 99, pp. 1-12.

Green et al., "Technical and economic evaluation of a solid-particle/air direct-contact heat exchanger", SERI/TR-252-2663, Oct. 1986, pp. 1-116.

Laughlin, "Pumped thermal grid storage with heat exchange", Journal of Renewable and Sustainable Energy, 2017, vol. 9, pp. 044103-1-044103-23.

Ma et al., "Design analysis of a particle-based thermal energy storage system for concentrating solar power or grid energy storage", Journal of Energy Storage, Jun. 2020, vol. 29, pp. 1-15.

* cited by examiner

FLUIDIZED-BED HEAT EXCHANGER FOR CONVERSION OF THERMAL ENERGY TO ELECTRICITY

CROSS-REFERENCE TO RELATED APPLICATIONS

This application claims the benefit of U.S. Provisional Application No. 63/052,128 filed on Jul. 15, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Renewable energy resources have been limited by the ability to store energy produced during off-peak times for use during peak times. Energy storage is important for variable-regeneration renewable energy sources, such as wind and solar. However, current battery technologies are too expensive for grid-scale, long duration energy storage. Molten salt storage is expensive and limited by salt stability and corrosion issues. Pumped energy storage in the form of hydroelectricity is limited by the geological conditions of the system as it requires two reservoirs at different vertical levels. Thus, there remains a need for improved energy storage systems capable of storing excess electricity produced by alternative energy sources such as wind and solar, to be recovered later during peak electricity demand.

SUMMARY

An aspect of the present disclosure is a heat exchanger configured to transfer thermal energy between a gas stream and a stream of solid particles, the heat exchanger including a means for contacting the gas stream with the stream of solid particles resulting in a transfer of thermal energy between the gas stream and the stream of solid particles, in which the heat exchanger is configured to gravitationally pass the stream of solid particles through the means for contacting, and the heat exchanger is configured such that the gas stream flows counter-current to the stream of solid particles. In some embodiments, the heat exchanger also includes an outer shell, and an inner shell, in which the means for contacting is positioned within the inner shell. In some embodiments, the heat exchanger also includes a gas inlet configured to direct the gas stream to the means for contacting. In some embodiments, the heat exchanger also includes a gas outlet configured to receive the gas stream from the means for contacting. In some embodiments, the gas stream has a temperature, and the temperature is substantially greater at the gas outlet than at the gas inlet. In some embodiments, the gas stream has a temperature, the temperature is substantially lower at the gas outlet than at the gas inlet. In some embodiments, the gas inlet includes a first pipe, the gas outlet includes a second pipe, the second pipe is positioned concentrically within the first pipe creating a first annular space, and the gas stream is configured to flow through the first annular space. In some embodiments, the gas inlet includes a first pipe, the gas outlet includes a second pipe, the first pipe is positioned concentrically within the second pipe creating a first annular space, and the gas stream is configured to flow through the first annular space. In some embodiments, the inner shell is positioned within the outer shell creating a second annular space, and the gas stream is configured to flow from the first annular space to the second annular space. In some embodiments, the inner shell is positioned within the outer shell creating a second annular space, and the gas stream is configured to flow from the first annular space to the second annular space. In some embodiments, the means for contacting is an empty volume within the inner shell. In some embodiments, the heat exchanger includes a means for distributing the gas stream through the means for contacting, in which the means for distributing is positioned before the means for contacting, relative to the direction of flow of the gas stream through the heat exchanger. In some embodiments, the means for distributing comprises a plate having an orifice, and the orifice is connected to a bubble cap. In some embodiments, the means for distributing includes a plurality of pipes having at least one orifice. in some embodiments, the heat exchanger also includes a means for directing the solid particles stream to the means for contacting, in which the means for directing is positioned before the means for contacting, relative to the direction of flow of the stream of solid particles through the heat exchanger. In some embodiments, the heat exchanger includes an outer shell, and an inner shell, in which the means for directing includes a port which penetrates the inner shell and outer shell. In some embodiments, the means for contacting results in a portion of the stream of solid particles entrained within the gas stream. In some embodiments, the heat exchanger also includes a means for separating the stream of solid particles from the gas stream. In some embodiments, the means for separating comprises a nozzle having an inlet, a first outlet, and a second outlet, the inlet is configured to receive the gas stream and the stream of solid particles, the first outlet is configured to release the gas stream from the nozzle, and the second outlet is configured to release the gas stream from the nozzle. In some embodiments, the means for separating Includes a filter. In some embodiments, the filter is a mesh filter.

An aspect of the present disclosure is a method for converting thermal energy to electrical energy, the method including transferring thermal energy from a plurality of solid particles to a gas stream using a heat exchanger, and using the gas stream to spin a turbine to generate electrical energy, in which the heat exchanger includes an outer shell, an inner shell positioned within the outer shell and having an internal volume, an annular space between the inner shell and the outer shell configured to allow the gas stream through the annular space, a pipe-in-pipe (PIP) gas line configured to direct the gas stream to the annular space, and a first port that penetrates the inner shell and the outer shell configured to direct the plurality of solid particles into the internal volume, in which the gas stream exits the annular space to pass through a distribution plate and into the internal volume, the internal volume is configured to contact the gas stream with the plurality of solid particles, the heat exchanger is configured such that the plurality of solid particles flow gravitationally through the internal volume to a second port located in the distribution plate configured to remove the plurality of solid particles from the heat exchanger, the heat exchanger is configured such that the gas flows counter-current to the plurality of solid particles to enter an upper portion of the internal volume, which is configured to separate the plurality of solid particles from the gas stream, and the PIP gas line is configured to remove the gas stream from the heat exchanger. The fluidizing gas velocity of the gas stream through the solids is optimized to maximize the heat transfer coefficient while minimizing the cross-sectional plan area, and therefore, the size of the inner annular space.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1A:
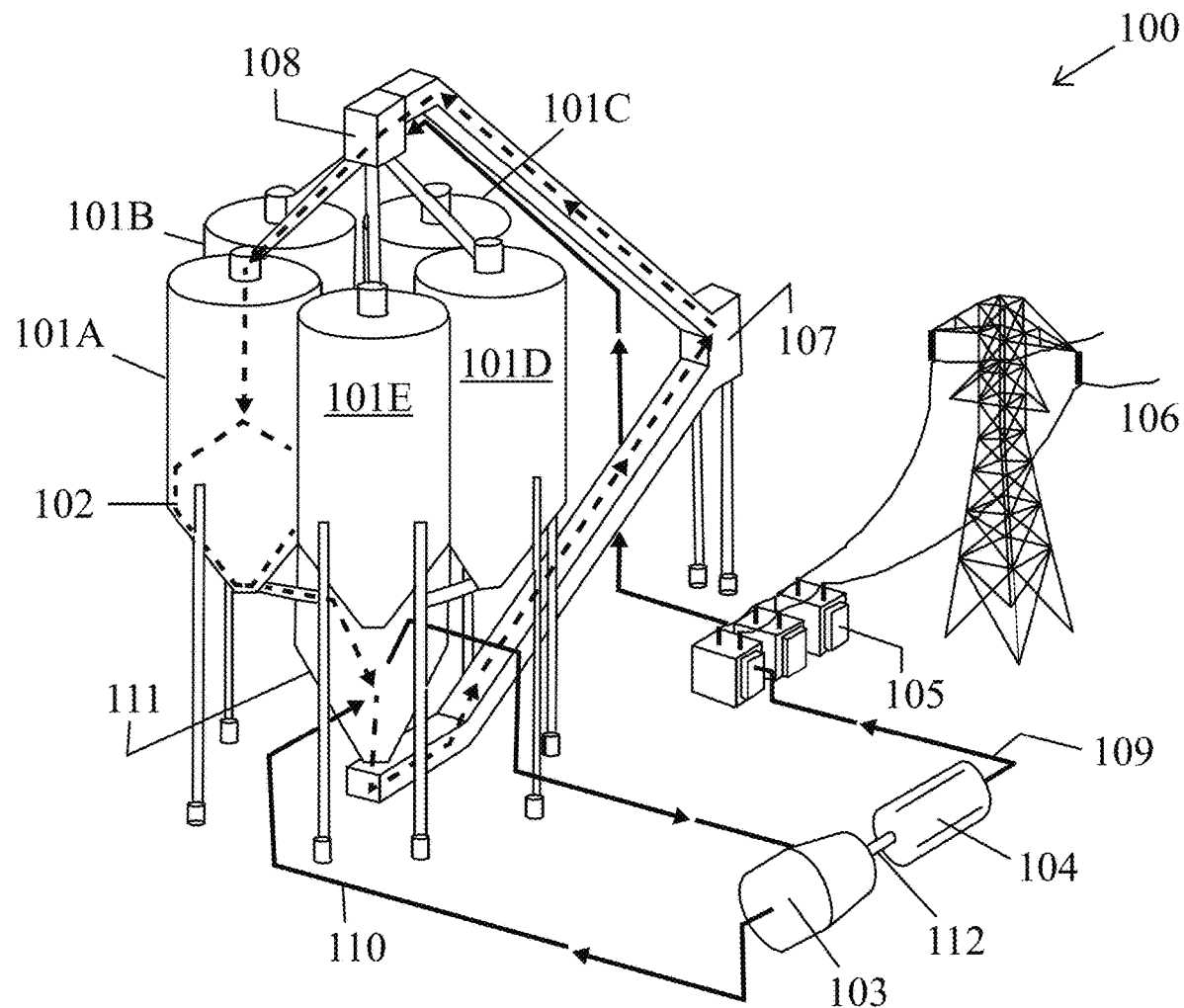
FIG. 1A illustrates a thermal energy storage system, including a pressurized fluidized-bed heat exchanger (PFB HX), according to some embodiments of the present disclosure.

100 . . . energy storage system
101 . . . silo
102 . . . solid particles and/or solid particle stream
103 . . . turbine
104 . . . generator or motor
105 . . . substation
106 . . . grid line
107 . . . particle conveyor
108 . . . particle heater
109 . . . electrical supply line
110 . . . gas and/or gas stream
111 . . . pressurized fluidized-bed heat exchanger (PFB HX)
112 . . . shaft
120 . . . means for contacting
130 . . . means for distributing
140 . . . means for directing
150 . . . fluidized-bed
155 . . . inner shell
157 . . . second annular space
160 . . . outer shell
165 . . . inner volume
167 . . . first port
168 . . . second port
170 . . . pipe-in-pipe gas line
175 . . . gas distributor
177 . . . upper portion
180 . . . nozzle
185 . . . bubble cap
186 . . . head pipe
187 . . . manifold pipe
190 . . . lock hopper
195 . . . skip hoist

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to heat exchangers for converting thermal energy stored in solid particles to electricity. Electro-thermal energy storage directly converts off-peak electricity into heat for thermal energy storage, which may be converted back to electricity, for example during peak-hour power generation. Thus, electro-thermal energy storage will, among other things, enable better incorporation of intermittent renewable energy sources such as solar and wind into existing electrical grids, which will in turn result in improved grid resilience. The heat exchanger for converting thermal energy stored in solid particles to electricity is an important part of an electro-thermal energy storage system, as it enables the conversion of thermal energy into electrical energy for redistribution to the grid. Thus, among other things, the present disclosure describes heat exchangers for this important energy conversion step. In some embodiments of the present disclosure, pressurized fluidized-bed heat exchangers (PFB HX) may achieve efficient conversion of thermal energy to electricity by providing direct contact of the solid particles with a gas stream. In some embodiments of the present disclosure, a fluidized-bed heat exchanger may utilize a multilayer configuration where the relatively hot gas resulting from the contacting of a relatively cold gas with the hot solid particles is then used to drive turbomachinery to generate electricity. As described herein, in some embodiments of the present disclosure, a fluidized-bed heat exchanger may use direct gas/particle contact to eliminate heat transfer surfaces, thus eliminating or reducing at least some of the ultrahigh temperature operations needed in an electro-thermal energy storage system.

FIG. 1A illustrates an energy storage system 100, according to some embodiments of the present disclosure. In this exemplary energy storage system 100, a silo 101 (i.e., a storage vessel; four shown 101A-D) is provided, which may be utilized for the storage of solid particles 102. A particle heater 108, as described in detail herein, may be positioned near and/or inside the silo 101, such that the particle heater 108 is configured to heat the solid particles 102 from a first relatively low temperature (e.g., between about 250° C. and about 500° C.) to a second relatively high temperature (e.g., between about 850° C. and about 1200° C.) during a "charging mode", where the solid particles are heated using electricity. Thus, a particle heater 108 may be an electric heater (e.g., using resistive heating elements), with the electric power needed to drive the particle heater 108 provided from the grid as shown by electrical supply line 109 shown in FIG. 1A. The heated particles 102, and the thermal energy stored within the solid particles 102, may then be stored within a silo 101 until such a time when the local or regional electrical needs (e.g., time periods of peak capacity) require that the thermal energy stored in the heated particles be converted back to electricity.

In some embodiments of the present disclosure, the thermal energy stored in the solid particles 102 may be converted to electricity by passing the hot solid particles 102 through a heat exchanger that transfers heat from the particles 102 to a heat transfer fluid or working fluid (i.e., gas and/or gas stream 110). For example, the hot solid particles 102 may be transported from the silo 102 to a fluidized-bed heat exchanger 111 in which the hot solid particles 102 come into direct contact with the gas 110. As shown in FIG. 1A, in some embodiments of the present disclosure, a fluidized-bed heat exchanger 111 may be integrated into a silo 102, such that the hot solid particles 102 may be transported by gravity from within the silo 102 to the fluidized-bed heat exchanger 111. In some embodiments of the present disclosure, for example when the fluidized-bed heat exchanger 111 is not integrated into the silo 102, the hot solid particles 102 may be transported to a fluidized-bed heat exchanger 111 gravitationally, pneumatically, non-mechanically (e.g., L-valves, J-valves, loop seals, etc.), and/or mechanically (e.g., by the use of a conveyer similar to particle conveyor 107). As shown in FIG. 1A, a fluidized-bed heat exchanger 111 may be configured to transfer heat from the solid particles 101 to a gas 110, (e.g., a heat transfer fluid or working fluid), thereby heating the gas 110 to a temperature between about 700° C. and about 1200° C. and cooling the solid particles 102 to a temperature between about 250° C. and about 500° C. The heated gas 110 may be subsequently directed to a turbine 103, which in turn may drive a shaft 112 connected to a generator or motor 104, such that the thermal energy recovered from the solid particles 102 is converted to electrical energy 109, which may then be transferred to a substation 105 and finally to a grid line 106 for transport to the power grid. The now expanded and cooled gas 110 may then be directed to a compressor (not shown) to provide the driving force needed to circulate the gas 110 back through the fluidized-bed heat exchanger 111.

Figure 1B:
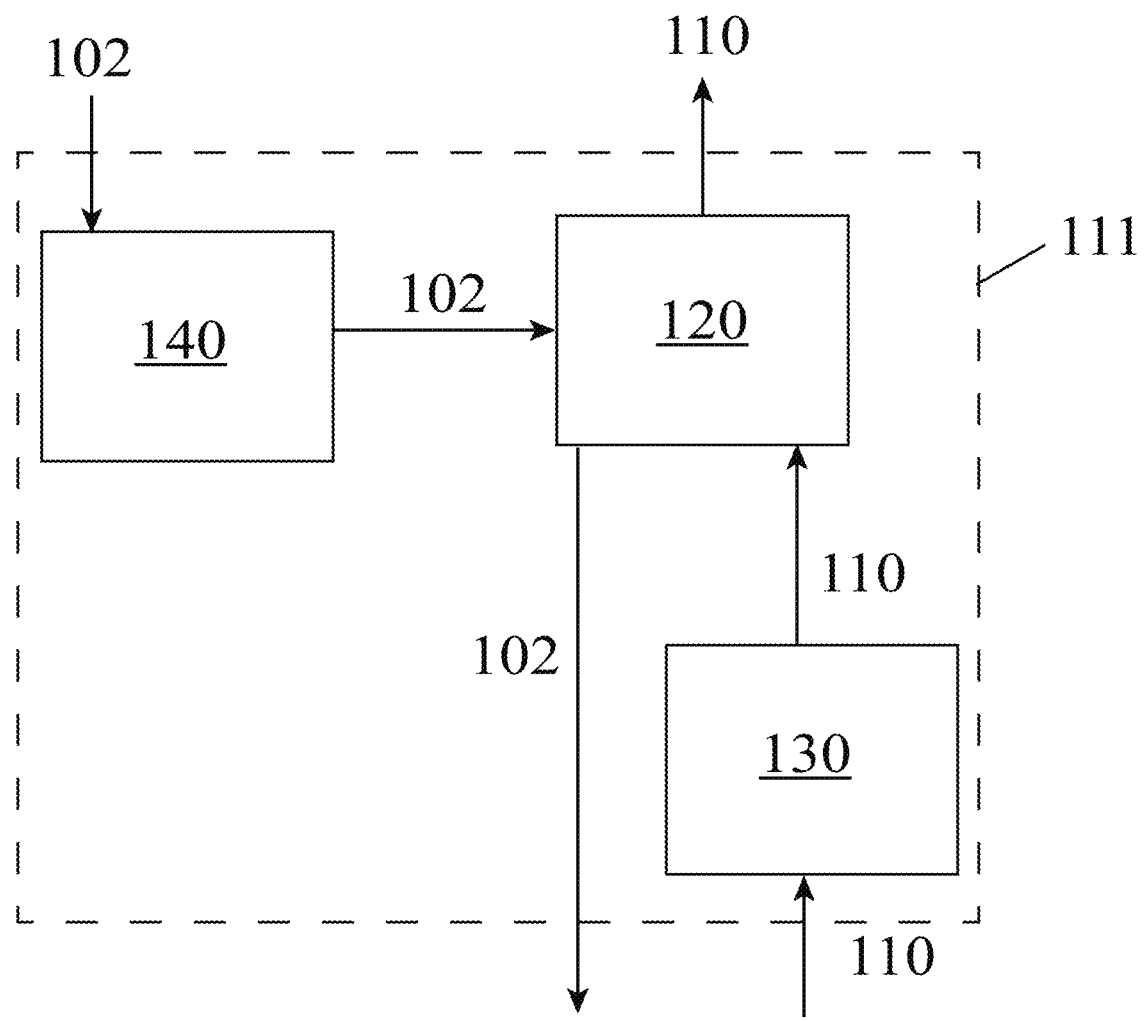
FIG. 1B illustrates a process flow diagram of a PFB HX, according to some embodiments of the present disclosure.

FIG. 1B illustrates a process flow diagram of a pressurized fluidized-bed heat exchanger (PFB HX) 111, according to some aspects of the present disclosure. In the example shown in FIG. 1B, the PFB HX 111 includes a stream of solid particles 102 and a gas stream 110. The two meet for the exchange of thermal energy in a means for contacting 120 the solid particles 102 and the gas 110. In some embodiments, prior to entering the means for contacting 120, the gas 110 may go through a means for distributing 130 the gas 110. In some embodiments, prior to entering the means for contacting 120, the solid particles 102 may go through a means for directing 140 the solid particles 102.

Figure 1C:
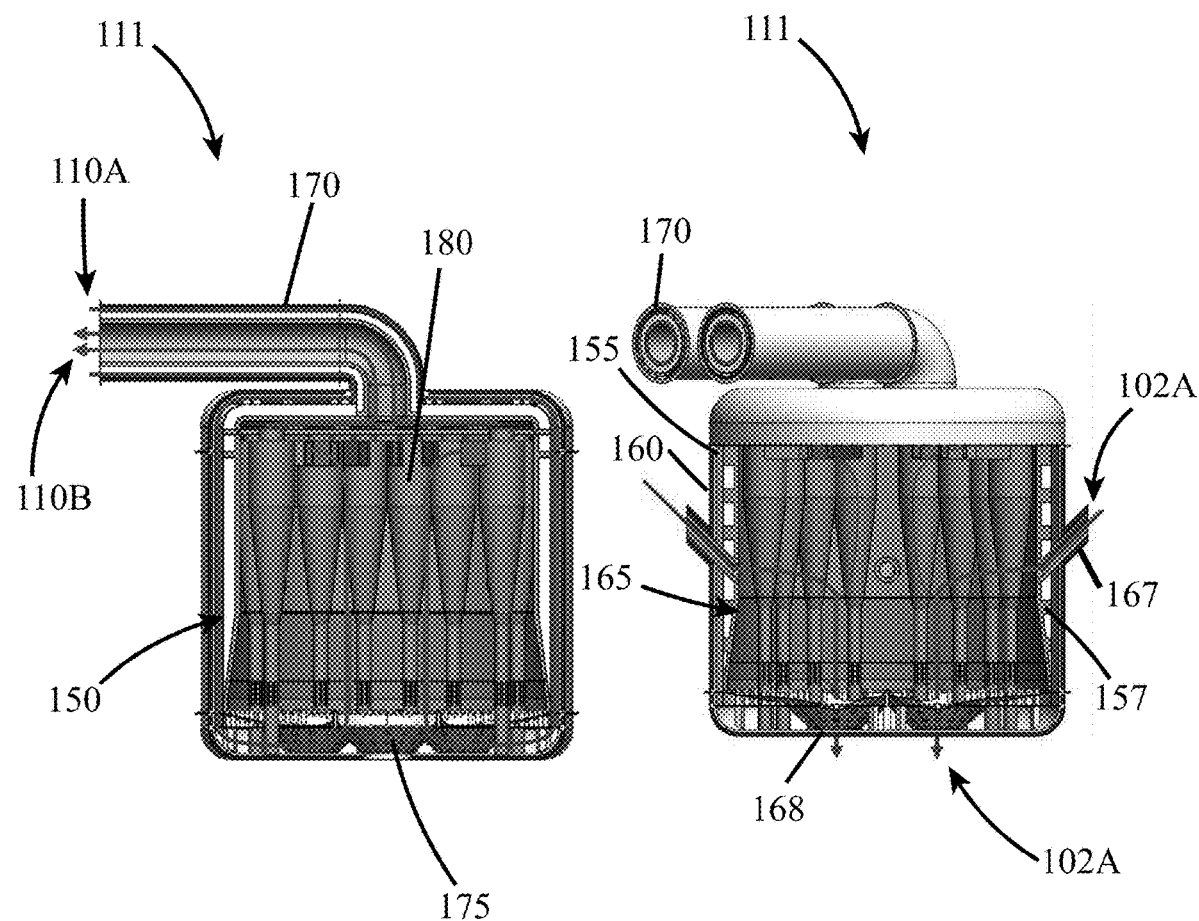
FIG. 1C illustrates generalized flow paths of gas (left) and solid particles (right) through an exemplary PFB HX, according to some embodiments of the present disclosure.

FIG. 1C illustrates a PFB HX 111, according to some embodiments of the present disclosure. The left panel highlights the flow of gas 110 through the PFB HX 111. The right panel highlights the flow of solid particles 102 through the PFB HX 111. A relatively cold gas 110 (e.g., about 300° C.) from a compressor (not shown in FIG. 1A) directs the gas 110A to a pipe-in-pipe (PIP) gas-line 170 constructed of an inner pipe concentrically positioned within an outer pipe, thus creating an annular space through which the incoming cool gas 110A flows. The PIP gas-line 170 directs the cool gas to an inner volume 165 (i.e., an annular space) formed by an inner shell 155, which contains the fluidized-bed 150 portion of the PFB HX 111, and an outer shell 160. While flowing through the inner volume 165, the gas 110 helps keep both shells (i.e., inner shell 155 and outer shell 160) relatively cool, allowing less expensive materials of construction to be used.

Eventually the gas 140 reaches the bottom of the PFB HX 111 to enter the fluidized-bed 150 where one or more gas distributors 175 evenly distribute the gas 110 across the cross-sectional area of the fluidized-bed 150. This in turn provides a uniform and consistent gas-to-solid ratio as a function of position within the fluidized-bed and maximizes heat transfer and efficiency. The gas 110 flows in an upward direction through the fluidized-bed 150, contacting the downward flowing solid particles 102. The solid particles 102A enter the PFB HX 111 through ports (i.e., first port 167) penetrating the outer shell 160 and the inner shell 155 to enter the fluidized-bed 150. The solid particles 102 fall by gravity to eventually collect on the gas distributors 175, where contact with the up-flowing gas 110 is promoted. During their fall through the fluidized-bed 150, the initially hot solid particles 102 are cooled to a temperature approaching that of the incoming gas 110A (e.g., about 300° C.). The cooled particles 102A then exit the PFG HX 111 through one or more lock-hoppers (190 shown in FIG. 13).

Simultaneously, the relatively cool up-flowing gas 110 contacts the relatively hot down-flowing solid particles 102 within the fluidized-bed 150 whose inner volume 165 is defined by the inner shell 155, resulting in a hot gas 110B exit exiting at a temperature that approaches that of the incoming solid particles (e.g., about 1200° C.). Internal baffles (not shown) may be positioned within the fluidized-bed 150 to divide it into separate sections, which can minimize backflow of both the gas 110 and the solid particles 102, thus improving performance of the PFB HX 111. In some embodiments, the fluidizing gas superficial velocity may be optimized to promote good lateral mixing of the downward flowing particles across the plan area of the inner volume, which may improve the performance of the PFB HX 111. The upper-most volume within the inner shell 155 is utilized for separating the solid particles 102 from the gas 110. An impingement plate (not shown) may prevent direct entrainment of solid particles 102 with the gas 110. One or more cyclones 180 provide most of the solid particle removal, resulting in a clean and hot gas stream 110B that exits the PFB HX 111, through the PIP gas line 170, to be directed to the electricity generating turbine (103), thereby accomplishing the objective of converting the solid particles 102 stored thermal energy into electrical energy.

Figure 2:
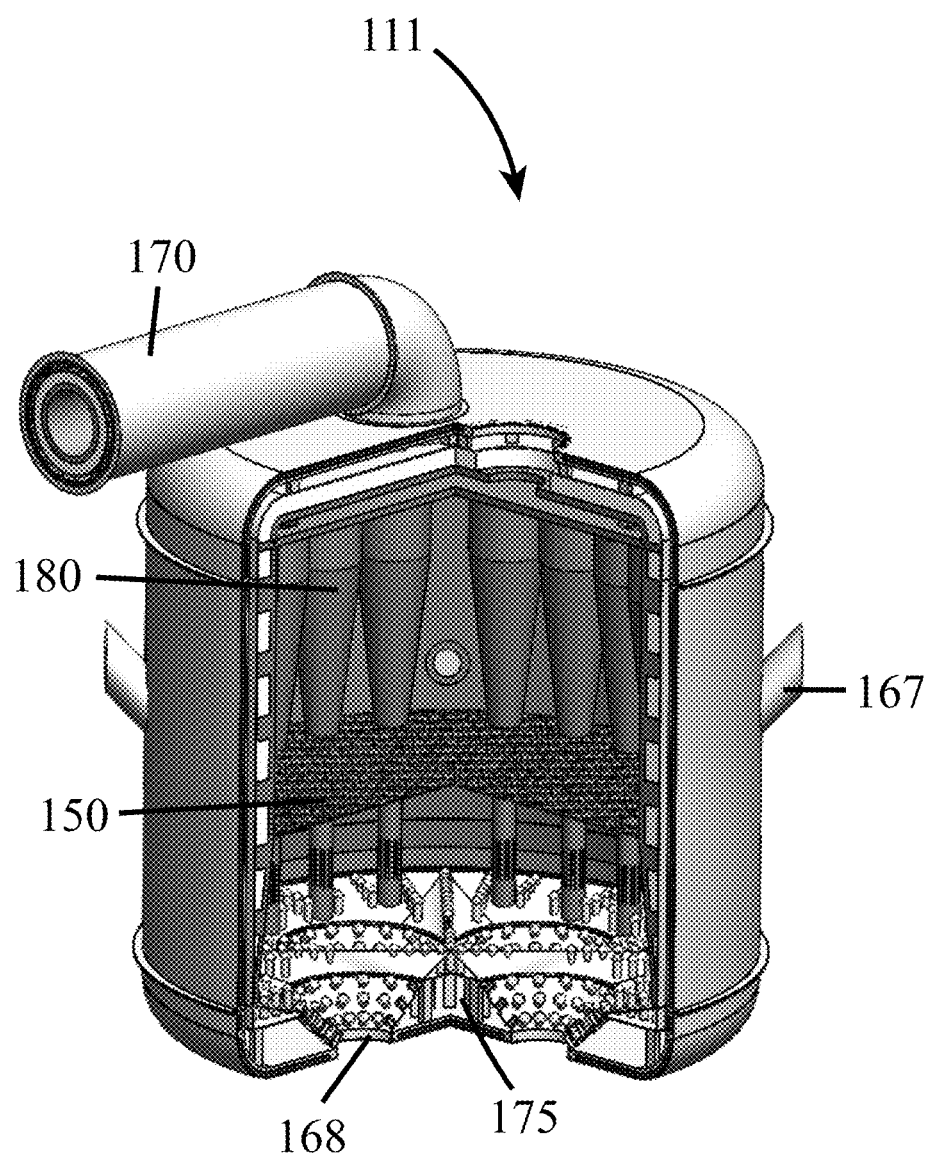
FIG. 2 illustrates an exemplary PFB HX, according to some embodiments of the present disclosure.

FIG. 2 illustrates an exemplary design concept for a PFB HX 111 for the transfer of thermal energy from solid particles 102 to gas 110 to be used to drive a turbine 103 to generate electricity, according to some embodiments of the present disclosure. In some examples, such a PFB HX 111 may be adapted and/or modified to achieve a low-profile arrangement of the PFB HX 111 relative to the hot-particle silos 101 storing solid particles 102 at about 1,170° C. As described herein, a PFB HX 111 may include an external, outer shell 160 that houses an inner shell 155, creating a gas gap between the inner shell 155 and the outer shell 160. The gas 110, which is a water/air mixture and may be supplied by the Brayton combined-cycle power (BCCP) compressors, may be directed to the PFB HX 111 to enter the gap between the inner shell 155 and the outer shell 160, thereby maintaining the exterior wall temperatures of the outer shell 160 at temperatures low enough (e.g., less than 350° C.) to allow the use of low-cost steels. Supply lines may then direct the gas 110 to one or more distributors, which evenly distribute the gas 110 across the PFB HX's 111 cross-sectional area dedicated to direct solid particles/gas contact. Thus, the gas flows through the PFB HX, contacting the particles, such that they are eventually heated to the desired exit temperature (e.g., greater than 1,170° C.).

Simultaneously, the solid particles are cooled as they are fluidized and eventually fall through the PFB HX 111 to eventually exit at their desired exit temperature (e.g., about 300° C.). The cooled solid particles 102 and the heated gas 110 are then directed to at least one nozzle 180 (i.e., a cyclone) (or two or more configured in parallel) to achieve solid particle/gas separation, by directing the solid particles 102 through the nozzle 180, with the gas 110 exiting the top of the nozzle 180 as hot, clean (i.e., without solid particles 102) gas 110 that can be subsequently directed to the turbine 103. Among other things, PFB HX 111 operating conditions described herein are designed for integration into the thermal energy storage (TES) system 100. Aspects of such integration include properly connecting the PFB HX 100 with the TES system 100 for charging and discharging solid particles 102, optimizing pressurized fluidization conditions, designing a steam (or superficial carbon dioxide) heat exchanger, and gas 110 clean-up. The exemplary PFB HX 111 design shown in FIG. 2 was developed has numerous unique innovations. First, this concept is suitable for the fluidization of inert solid particles 102 to heat a pressurized gas 110. Further, the design an outer pressure vessel (i.e., outer shell 160) in which occurs the direct contact of solid particles 102 with gas 110, thereby encapsulating all of the heat transfer in a compact unit. The PFB HX 111 designs described herein also consider the capacity required for long-term energy storage requiring multiple particle storage silos 101, which may be arranged around a single PFB HX 111, with each silo 101 feeding the PFB HX 111 through dedicated pipe or conduit to individual inlets positioned in the sides of the PFB HX 111; e.g., four particle inlets (i.e., ports 167) for four silos 101 were utilized in this design, although this should not be limiting is provided for illustrative purposes. Further, a solid particle 102 exit port 168 may be designed to provide even distribution of solid particles 102 within the PFB HX 111, as well as uniform heating of the gas 110.

Figure 3:
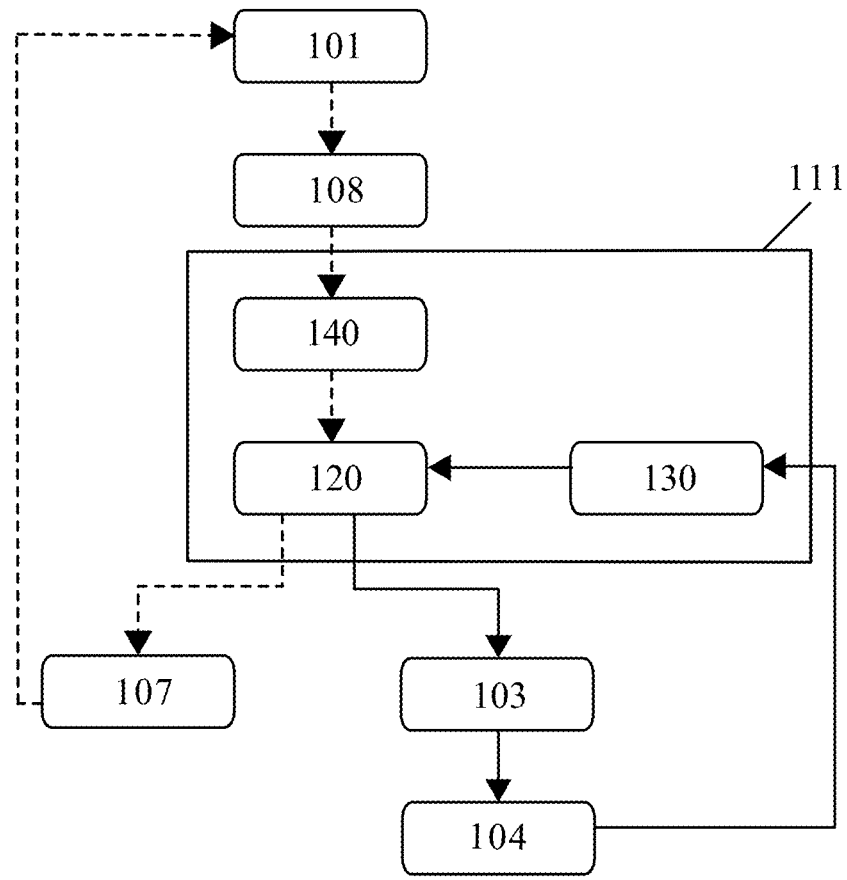
FIG. 3 illustrates a flow diagram of how gas and particles move through the thermal energy storage system of FIG. 1A, according to some embodiments of the present disclosure.

FIG. 3 illustrates a flow diagram of how a solid particle stream 102 and a gas stream 110 flow through the parts of a PFB HX 111, according to some embodiments of the present disclosure. Thermal energy stored in hot solid particles 102 heat a compressed gas 110 that drives a power turbine 103 for electricity production. The PFB HXs 111 described herein are designed to maximize the gas-solid particle heat transfer while maintaining an acceptable pressure drop through the heat exchanger 111. Among other things, the PFB HX 111 designs described herein provide a countercurrent gas 110/solid particle 102 flow to heat the gas 110 to a temperature close to that of the incoming hot solid particles 102 while cooling the solid particles 102 to a temperature approaching that of the incoming gas 110.

To achieve the objective of simultaneously heat the gas 110 while cooling the solid particles 102, numerous engineering innovations were needed including process control, bed layout, particle flow, particle handling, and process integration. In some embodiments of the present disclosure, the PFB HX 111 may connect directly with a compressor and/or a turbine 103. In some embodiments of the present disclosure, a PFB HX 111 may have an outer shell 160 that maintains the gas 110 pressure and an inner shell 155 that contains a high-temperature core for heat transfer between the gas 110 and the solid particles 102. The walls of an inner shell 155 may be insulated using at least one of a refractory layer and/or ceramic fiber insulation. The flow paths of both the solid particles 102 and the gas 110 through a PFB HX 111 and a larger energy storage system 100, as described herein, are illustrated in FIG. 3.

Although solid particle 102 weight may be sufficient to achieve gravitational flow of the solid particles 102 into a PFB HX 111, the weight may not be adequate to overcome the pressures and flow resistances present in a PFB HX 111. Thus, in some embodiments of the present disclosure, solid particles 102 may feed through a high-temperature lock hopper (190 shown in FIG. 13) connected to a storage silo 101. The lock hopper 190 may then feed the PFB HX 111 by charging the lock hopper 190 in an unpressurized state by gravitationally feeding the solid particles 102 into the lock hopper, then pressurizing the lock hopper 190 to the pressure (or greater than) the inlet pressure of the PFB HX 111, followed by discharging the solid particles 102 into the PFB HX 111.

In some embodiments of the present disclosure, a mixture of compressed air and steam from a power island may be directed into a PFB HX 111. In some embodiments of the present disclosure, the low-temperature mixture of air and water fed into the outer shell 160 of the PFB HX 111 may provide significant cooling capacity to cool the outer shell 160 to temperatures compatible with carbon steel as the material of construction for the outer shell 160.

In some embodiments of the present disclosure, the fluidization velocity to fluidize the solid particles 102 may be above a minimum fluidization velocity, but below the turbulent regime and particle terminal velocity. The multi-layer fluidized-bed 150 may use a refractory grid material (i.e., mesh or a filter) to prevent solid particle 102 mixing along the top of the bed to accomplish countercurrent gas 110/solid particle 102 flow and to maintain the desired temperature gradient. The PFB HX 111 is designed to achieve direct contact and countercurrent flow between the solid particles 102 and the gas 110, while providing adequate height to enable the solid particles 102 to disengage from the gas 110. In some embodiments of the present disclosure, an impingement device may be implemented to enhance separation of the solid particles 102 from the gas 110 in order to successfully return the solid particles 102 back to the PFB HX 111. As shown herein, the hot gas 110 and the cool solid particles 102 may be separated using one or more nozzles 180 (i.e., cyclones) positioned inside the inner shell 155 forming the pressure vessel. In some embodiments of the present disclosure, the cool solid particles 102 may exit the PFB HX 111 through a low-temperature rotary valve positioned at the bottom of the PFB HX 111 to be collected by a conveyor 107, which then transports them (e.g., by a skip hoist 195 shown in FIG. 13) to a storage silo 101.

Gas-particle heat transfer is an important step in both the energy storage charging (i.e., electricity to thermal energy conversion) and energy discharging (i.e., thermal energy to electricity conversion) processes. In some embodiments of the present disclosure, for energy discharging, a PFB HX 111 may be configured to provide direct heat transfer between the hot solid particles 102 and a pressurized gas 110 to heat the gas 110 to drive a turbine 103. Such direct gas/solid particle contact reduces or eliminates the cost and exergy losses resulting from heat exchanger surfaces commonly found in indirect heat exchangers. In the energy storage system described herein, the hot gas 110 exits the PFB HX 111 at temperatures sufficiently high to drive a high-efficiency Brayton combined-cycle power (BCCP) system. Aspects of the PFB HX 111 and BCCP integration described herein may be based on a gas-turbine combined cycle (GTCC) system and/or a commercial pressurized fluidized-bed combustion plant integrated with a GTCC system.

Among other things, the PFB HX 111 designs described herein enable operational temperatures of at least 1,200° C., which further enables its integration with a BCCP system. PFB HX 111 innovations disclosed herein include fluidizing inert solid particles 102 at temperatures at least 300° C. higher than those common in commercial pressurized fluidized-bed plants, while achieving low pressure drops, high heat-transfer rates, effective gas/particle separation, and enabling the integration with the thermal energy storage (TES) and/or the BCCP system. The PFB HX 111 technology described herein is, among other things, more efficient, compact, and provides higher particle heat-transfer coefficients than what can typically be achieved for heating gas 110 in a traditional heat exchanger, where the solid particle/gas heat transfer occurs through a heat transfer surface. Some performance parameters for the PFB HX 111 designs described herein include the heated and pressurized gas 110 achieving exit temperatures greater than 1,170° C. (to meet the BCCP thermal load), and, in some embodiments, gas 110 pressure drop through the PFB HX 111 of less than 5% of the inlet pressure. As described below, fluidization conditions and gas/solid particle separation metrics occurring inside the PFB HX 111 were analyzed to provide design and operational insights and guidance for future full-scall PFB HX 111 designs. For example, the fluidizing velocity of the gas stream 110 (i.e., superficial gas velocity) may be optimized to maximize the heat transfer coefficient at mildly fluidized conditions while providing a cost effective cross-sectional area plan of the PFB HX 111 to minimize the internal volume of the PFB HX 111 and thus cost. Further, a mildly fluidized-bed 150 condition provides the possibility for a more pronounced top-to-bottom temperature gradient with the highest temperature solid particles 102 at the top surface of the fluidized bed 150, which may heat the counter flowing gas stream 110 to a higher temperature than a typical well-mixed, well-fluidized bed with its typical top-to-bottom temperature gradient. In the PFB HX 111, there may be a net downward (i.e., gravitational) flow of solid particles 102 counter-current to the upward (i.e., opposite of gravity) flowing gas stream 110.

In some embodiments of the present disclosure, a PFB HX 111 may be integrated with a power generation system by utilizing, among other things, a pipe-in-pipe (PIP) 170 gas line. A compressor in the power generation system may supply a pressurized, low-temperature gas through to the annular space created by the PIP 170 configuration to be subsequently directed into the PFB HX 111. The low-temperature gas may flow through the annular space of PIP 170 gas line, and subsequently through an inner space (i.e., a jacket) created by positioning the outer shell 160 of the PFB HX 111 around an inner shell 155. As described above, low-temperature inlet gas 110 provides cooling capacity to the outer shell 160 to provide sufficiently low operating temperatures for the outer shell 160, while also cooling the material making up the inner shell 155. The now somewhat preheated compressed gas 110 may enter the fluidized-bed 150 portion of the PFB HX 111 contained within the inner shell 155, by being directed to gas distributor 175 positioned at the bottom of the PFB HX 111, where it contacts and fluidizes the downward flowing solid particles 102 in a counter-current and direct contact mode, thereby heating the gas 110 and cooling the solid particles 102. The heated gas 110 may then exit from the top of the PFB HX 111 after being separated from the solid particles 102 in a gas-solid separations unit operation, such as one or more nozzles 180. This removal of the clean hot gas 110 may be achieved by directing it once again through the PIP 170 gas line, but this time through the central pipe of the PIP 170 gas line, where it is subsequently directed to turbine 103 that converts the energy transferred from the solid particles 102 to the gas 110 to electrical energy.

As described herein, the fluidized-bed 150 positioned within the inner shell 155 contains the hot solid particles 102 and operates at high temperatures. Thus, the walls of the inner shell 155 may be insulated using refractory and/or other materials, e.g., at least one of the outer surfaces and/or inner surface of the metal inner shell 155. As describe above, an inner shell 155 constructed of metal may be in contact with the low-temperature inlet compressed gas 110. The combination of cooling provided by the low-temperature gas 110 entering and flowing through the jacket, with insulating the inner shell 155 helps maintain a low outer shell 160 operating temperature. This design may also result in a relatively small pressure drops occurring in the PFB HX 111, because the fluidized-bed 150 is contained within the pressurized inner shell 155.

Figure 4:
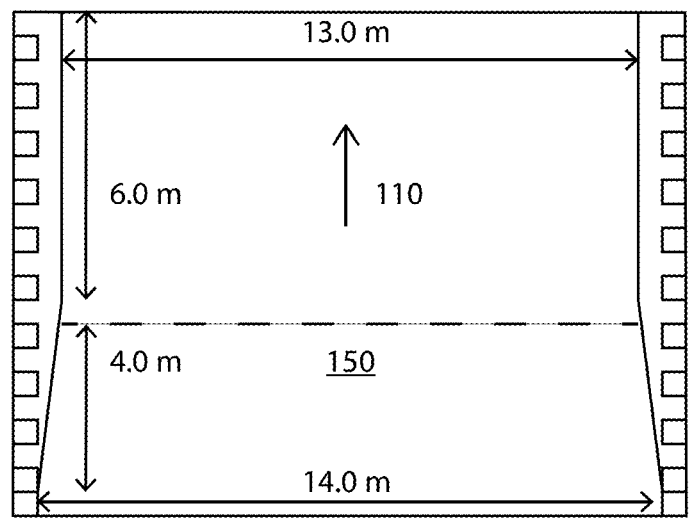
FIG. 4 illustrates the geometry used in a finite element analysis (FEA) of insulating designs, according to some embodiments of the present disclosure. Refractory is the dark brown, the voids were filled with calcium silicate fiber, and there is a thin, steel shell. Panel (b) illustrates the thermal boundary conditions applied to the FEA problem. Adiabatic conditions were applied to the top and bottom boundaries.

To minimize or prevent the high-temperature core from losing heat to the cooler outer shell 160, insulation may be positioned on the inside wall of the inner shell 155; the space formed by the inner shell and the outer shell may be described as follow: outer shell insulation-outer shell metal-jacket space for incoming air-inner shell metal-inner shell insulation. Using finite element analysis (FEA) software, an insulation design for the inner shell that meets the constraints of the PFB HX temperature profiles and operating conditions was determined. The model description can be found in FIG. 4. FIG. 4 illustrates the geometry used in the steady-state FEA analysis. The geometry corresponded to a 14.0-m diameter inlet, contracting to 13.0-m diameter through a 4.0 m dense phase region (i.e., fluidized-bed 150), and a 6.0 m tall freeboard section; The design is based on the operating condition of a 270 MWt PFB HX 111 integrated into an electro-thermal energy storage system 100, as illustrated in FIG. 1A.

The insulation layer of the inner shell 155 may include thick refractory rods that may protrude from the refractory shell to attach to the steel inner shell 155 for structural support. The cavities within the refractory structures may be filled with, for example, calcium silicate ($Ca_2SiO_4$ or CalSil) insulation fibers (see FIG. 1B). Calcium silicate has superior insulating properties, is lightweight, and cheaper than refractory materials, but lacks the strength of refractory structures. The dense phase region (i.e., fluidized-bed 150) has a linear temperature profile rising from 300° C. near the inlet/bottom to 1200° C. at the top of the fluidized-bed 150 representing the temperature gradient expected in the dense phase portion of the PFB HX 111 as the solid particles 102 cool as they fall, and the gas 110 heat up as it rises. The freeboard region was characterized by convection between the wall and the heated gas 110. The exterior of the metal shell boundary condition was also convective with an ambient air temperature of 300° C. (the gas return temperature from turbine and compressor) and heat transfer coefficients were estimated by correlations for annular pipes. The corresponding correlations are summarized in Eq. (1) and (2) below.

$$Nu = \frac{hL}{k} = 0.022 Re^{0.8} Pr^{0.6} \tag{1}$$

$$Nu = \frac{hL}{k} = \frac{\left(\frac{\xi}{8}\right) Re Pr}{K_1(\xi) + K_2(\xi)\left(Pr^{\frac{2}{3}} - 1\right)\left(\frac{\xi}{8}\right)^{\frac{1}{2}}} \tag{2}$$

Where:

$$\xi = (1.82 \log(Re) - 1.64)^{-2}$$

$$K_1(\xi) = 1 + 3.4\xi \quad K_2(Pr) = 11.7 + 1.8 Pr^{-1/3}$$

The properties of air at 300° C. were used to approximate the properties of the gas 110 and were held constant for all cases; these values are summarized in Table 1 below.

TABLE 1

Material and material properties used in the insulation design study.

| Property | Symbol | Value | Units |
|---|---|---|---|
| Density | $\rho$ | 0.6172 | kg/m³ |
| Thermal conductivity | k | 0.0450 | W/m-K |
| Heat capacity | $c_p$ | 1045.00 | J/kg-K |
| Prandtl number | Pr | 0.6800 | — |

Figure 5:
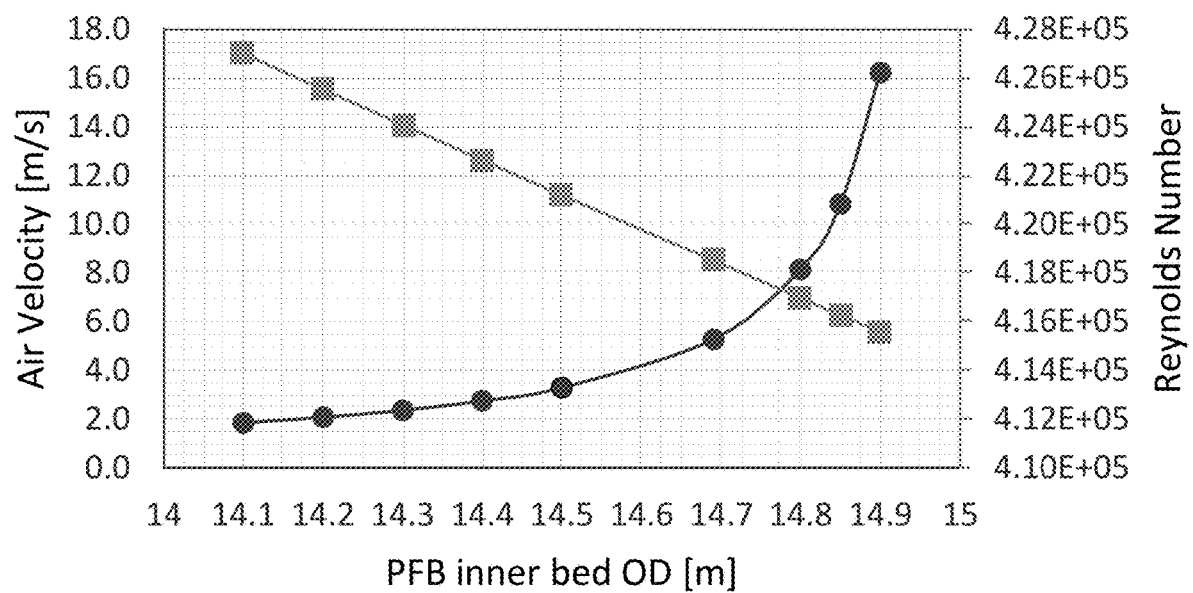
FIG. 5 illustrates the relationship between the outside diameter of the fluidized-bed, as defined by the inner shell, when insulation is included and the velocity (circles, left axis) and Reynolds number (squares, right axis) of the air that flows around the PFB, according to some embodiments of the present disclosure.

The Reynolds number, Re, changed based on the outer diameter of the metal shell, as the outer diameter of the metal shell for the inner bed approached the inner diameter of the pressure vessel (15.0 m) the velocity, v [m/s], increased to maintain a constant mass flow rate of air for all cases. The relationship between outside diameter of the inner bed and the air velocity and Reynolds number is shown by FIG. 5. This fully defines the thermal boundary conditions used in the insulation model. Table 2 lists the materials and their associated properties that are input parameters in the FEA study.

TABLE 2

Material and material properties used in the insulation design study.

| Material | Density [kg/m³] | Heat Capacity [J/kg-K] | Thermal Conductivity [W/m-K] | Source |
|---|---|---|---|---|
| Petromax ® 700 LTM | 1000.0 | 1000.0 | 0.30 | Allied |
| CalSil Fiber (1400° C.) | 64.0 | 1000.0 | 0.11 | JR Refractory |
| Structural Steel | 7850.0 | 434.0 | 60.50 | ANSYS Mechanical |

Figure 6:
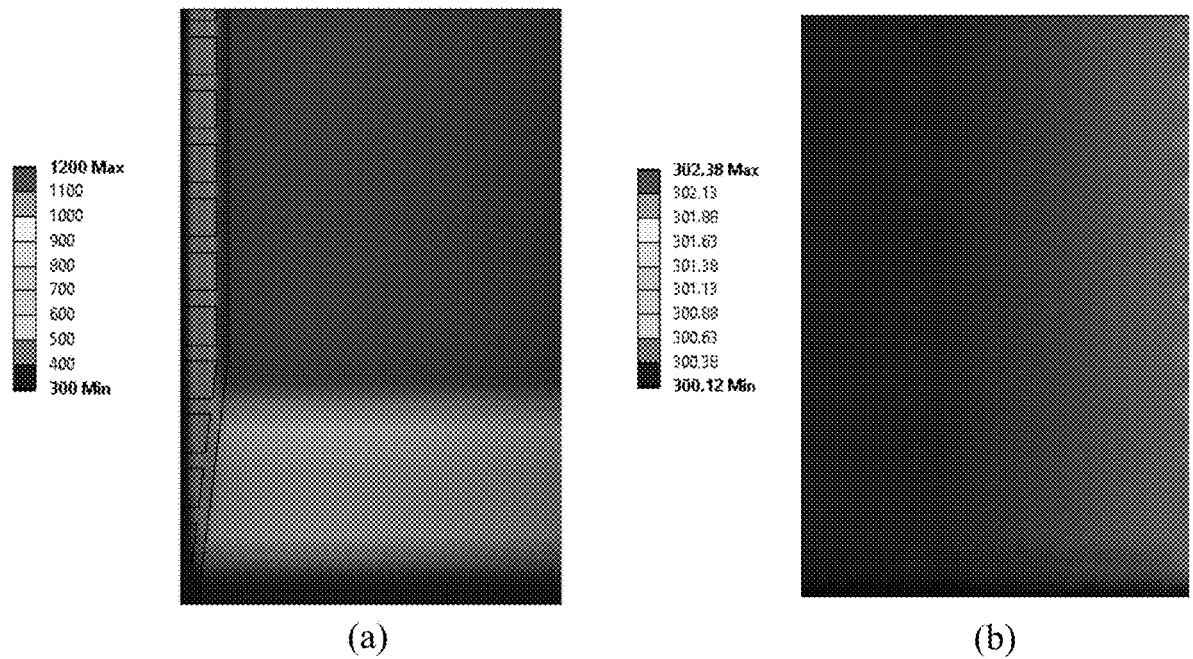
FIG. 6 illustrates a steady-state temperature distributions from the FEA analysis of the interior, Panel (a), and the exterior faces, Panel (b), of an exemplary insulation design selected for an exemplary PFB HX, according to some embodiments of the present disclosure. All units are in Celsius. Black lines in (a) mark changes in materials.

Panels (a) and (b) of FIG. 6 illustrated the selected insulation design and the resultant temperature distribution. This is for illustrative purposes and is not intended to be limiting. For this exemplary insulation design, the outside diameter of the inner shell 155, D, was set to 14.40 m. The refractory was 200 mm thick excluding the supporting rods.

The CalSil fiber was 475 mm thick at the thickest point (the freeboard region). The metal wall of the inner shell 155 was 25 mm thick.

In Panel (a) of FIG. 6, the applied linear temperature profile in the dense phase region (i.e., the fluidized-bed 150) can be seen. The convective boundary condition applied to the interior surface in the freeboard region resulted in the wall temperature being very close to 1200° C. Panel (b) of FIG. 6 illustrates the exterior wall temperature distribution. Small hot spots are visible where the refractory support rods come in contact with the metal of the inner shell 155; this is expected as the refractory has a thermal conductivity three times higher than that of the CalSil fiber. For this exemplary case, the exterior temperatures of hot spots were 304.14° C. and 304.32° C. using the Kays and Petukhov Popov correlation, respectively. Using the average of the two average exterior temperatures, the gas 110 temperature rise from flowing around the high-temperature core was predicted using Eq. (3) below.

$$\ln\left(\frac{T_{ext} - T(x)}{T_{ext} - T_{in}}\right) = \frac{-4hDx}{\rho c_p v(15^2 - D^2)} = -Cx \qquad (3)$$

$$T_{out} = T(x = L) = T_{ext} - (T_{ext} - T_{in})e^{-CL}$$

The calculation showed the gas 110 was only predicted to rise about 2.3° C., a relatively insignificant temperature rise. Therefore, the insulation design was validated as being sufficient to meet the design constraints of an exemplary PFB HX 111 design.

Figure 7:
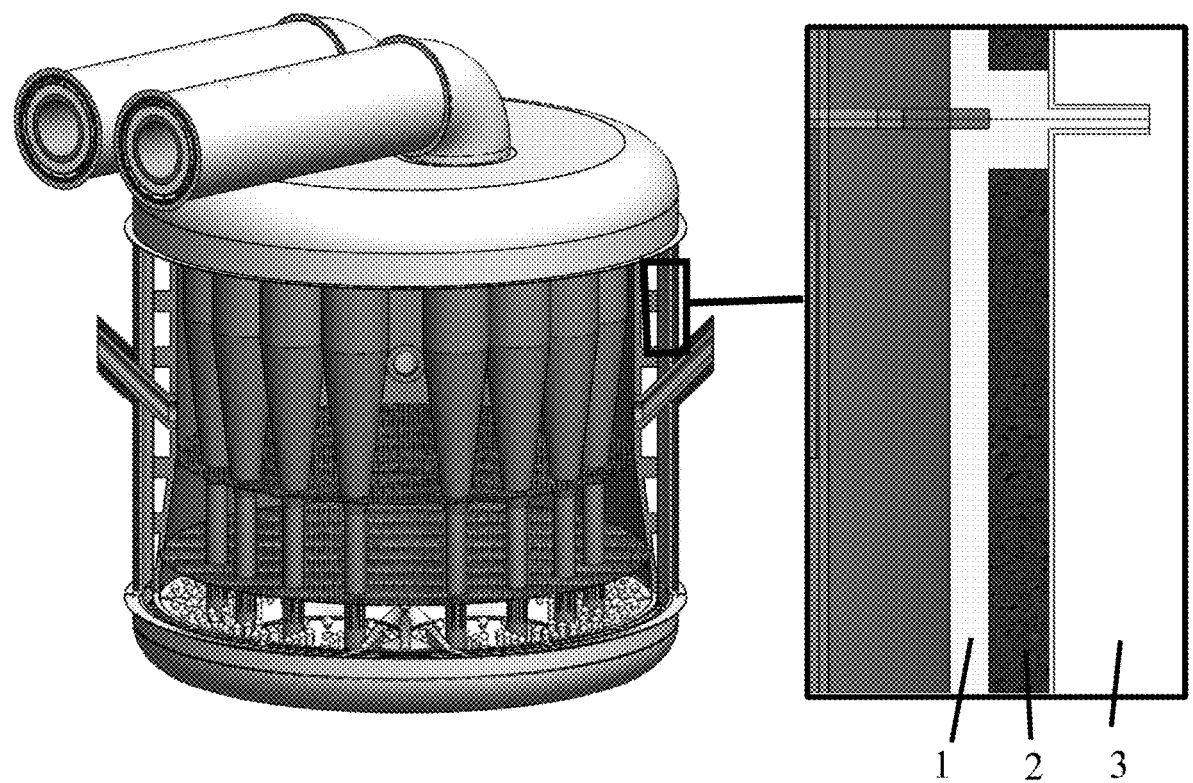
FIG. 7 illustrates a pressure vessel shell design for a PFB HX, for the outer shell, using mineral wool insulation with a steel shell, according to some embodiments of the present disclosure.

The outer shell 160 holds the pressure of the fluidized-bed 150 and, therefore, must be designed to withstand the pressure differential between the interior and exterior pressures, which in some embodiments of the present disclosure, may be about 20 bar. If the hot-temperature core was not well insulated and/or if the cool inlet gas 110 was not directed between the inner shell 155 and the outer shell 160, more expensive, high-temperature steel and/or alloys would be required. However, since the PFB HX 111 may include design features, the outer shell 160 may operate at relatively low temperatures. The outer shell 160 may also be insulated to prevent heat loss to the ambient air. FIG. 7 illustrates an exemplary structure of an outer shell 160, according to some aspects of the present disclosure. The associated dimensions for the insulation found using a one-dimensional (1D) heat resistance model are AISI 4340 Steel (1) 0.100 m, mineral wool (2) 0.150 m, and A36 steel shell (3) of 0.0127 m.

The design for a PFB HX 111 may be highly dependent on the operating conditions of the TES system 100. Additionally, compared to other parts of the power system, the PFB HX 111 significantly affects the TES system 100 design. The basic size for a PFB HX 111 vessel, the gas pressure drops, as well as the heat losses to the ambient environment were calculated to explore system design requirements, which are summarize in Table 3 for an exemplary PFB HX 111.

TABLE 3

Preliminary PFB design dimensions and key parameters.

| Specification | Unit | Value |
| --- | --- | --- |
| PFB Pressure Vessel ID | m | 15.00 |
| PFB Pressure Vessel OD | m | 15.52 |
| PFB Pressure Vessel Height | m | 15.18 |
| PFBHX Height | m | 13.30 |
| PFBHX Dense Region ID | m | 14.00 |
| PFB Freeboard Region ID | m | 13.00 |
| PFBHX Minimum Fluidization Velocity | m/s | 0.166 |
| Calculated Required Cyclone Number | — | 15 (16 used) |
| Cyclone Inner Diameter | m | 2.25 |
| Calculated Cyclone Efficiency | % | 99.934 |

Figure 8:
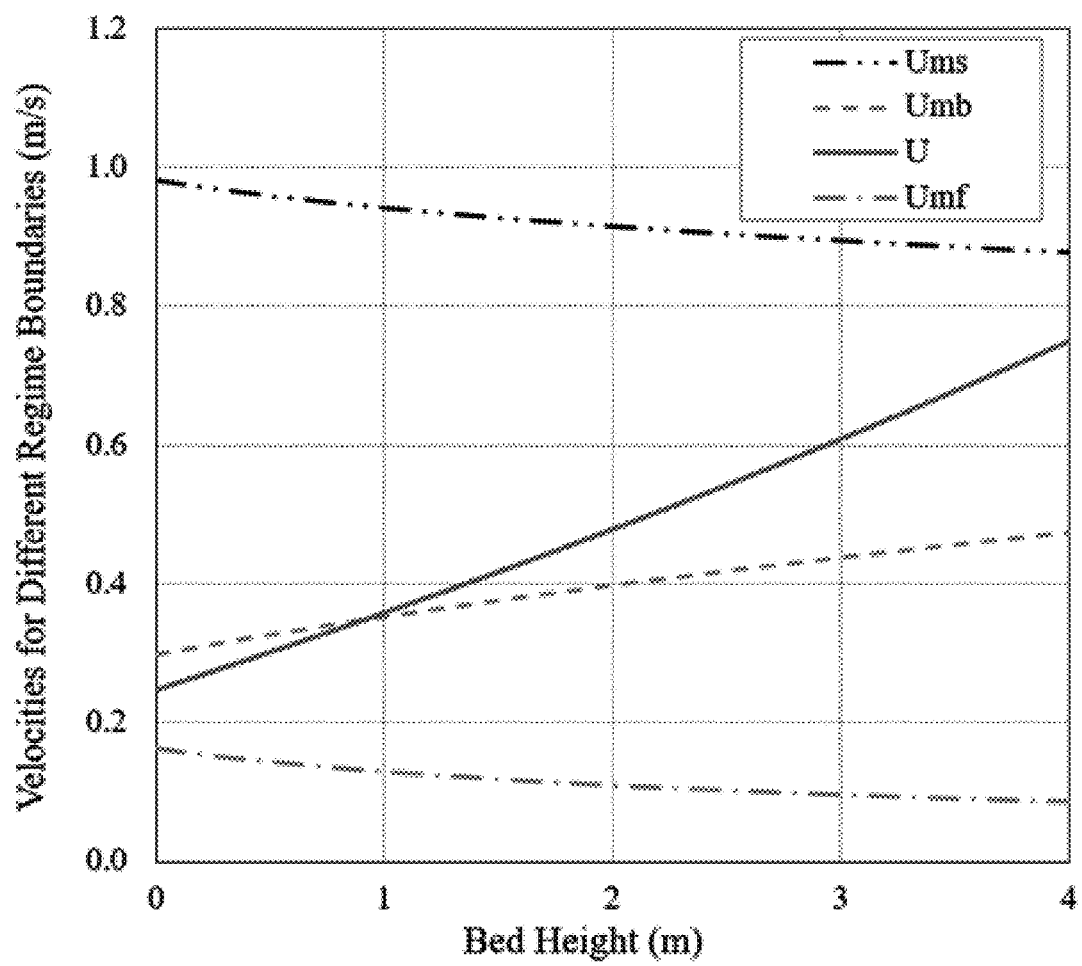
FIG. 8 illustrates that the gas velocity as a function of its vertical position within a fluidized-bed stays in a range of smooth fluidization, according to some embodiments of the present disclosure.

The minimum fluidization velocity changes with the operating temperature and pressure inside the PFB HX 111. For the exemplary design described herein, the fluidized-bed 150 portion of the PFB HX 111 was designed based on three times (3×) the minimum fluidization velocity and thus fluidization will rise with an increase in temperature along the bed height. In some embodiments of the present disclosure, in order to minimize the fluidization mixing and backflow of solid particles 102 and/or gas 110, which can reduce the temperature gradient between the solid particles 102 and gas 110, the fluidized-bed 150 portion of a PFB HX 111 may be separated in the vertical direction into sections divided by baffles. FIG. 8 illustrates the gas 110 velocity as a function of fluidized-bed height, resulting from temperature changes. The selected fluidization velocity was below the velocity of a turbulent bed and the particle terminal velocity, to minimize solid particle 102 entrainment in the gas exiting the top of the fluidized bed 150. In some embodiments, the heat transfer coefficient may be optimized in the range of two to three times the minimum fluidization velocity. The bed height accommodates a gas/solid particle disengagement distance as a first stage of gas/particle separation. Baffles may be utilized to minimize particle entrainment, with any remaining solid particles 102 in the gas 110 being removed by a nozzle 180 (i.e., cyclone separator) before the heated gas 110 is returned to the turbine 103 for electricity generation.

Figure 9:
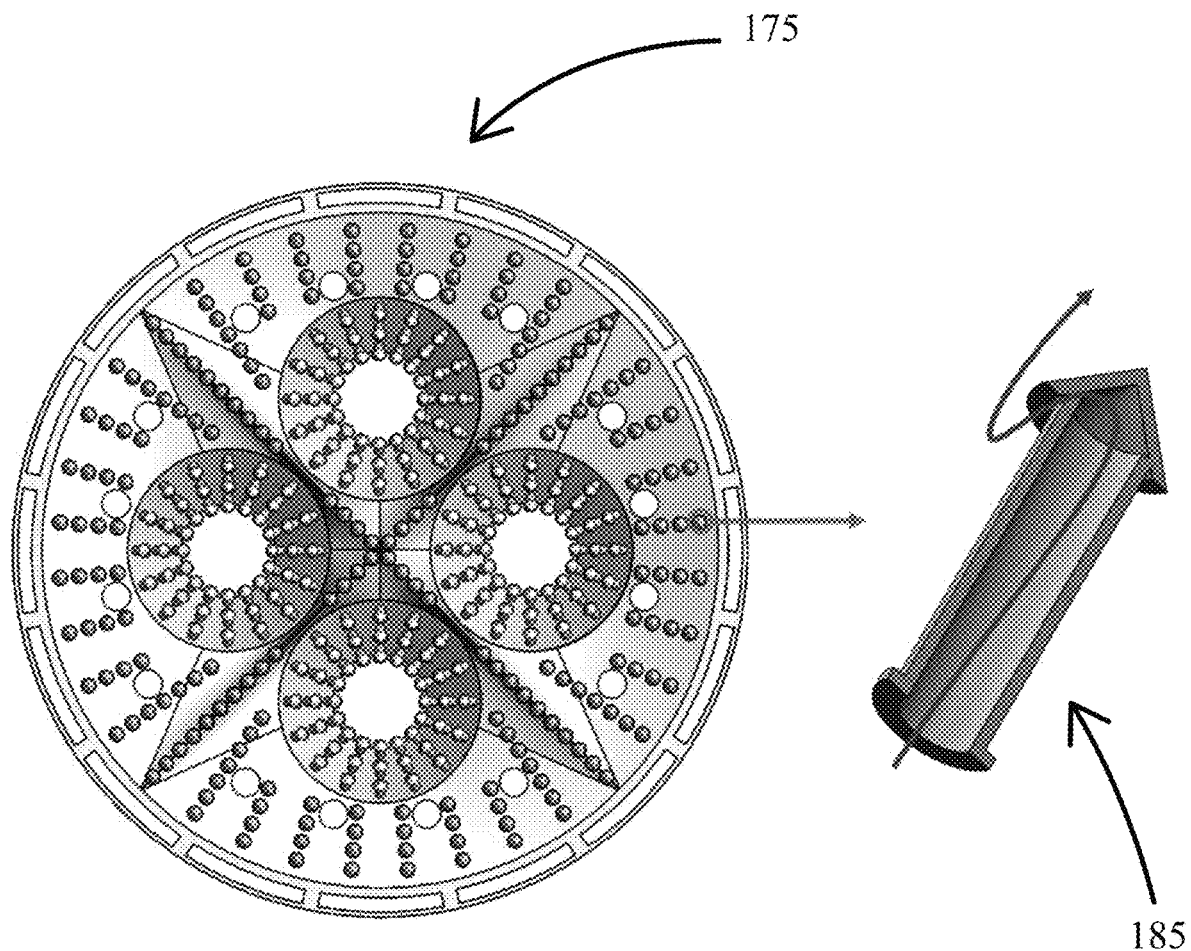
FIG. 9 illustrates a first exemplary gas distributor (left), according to some embodiments of the present disclosure. An individual "bubble-cap" is illustrated on the right. The solid line illustrates gas flow through the bubble cap.
Figure 10:
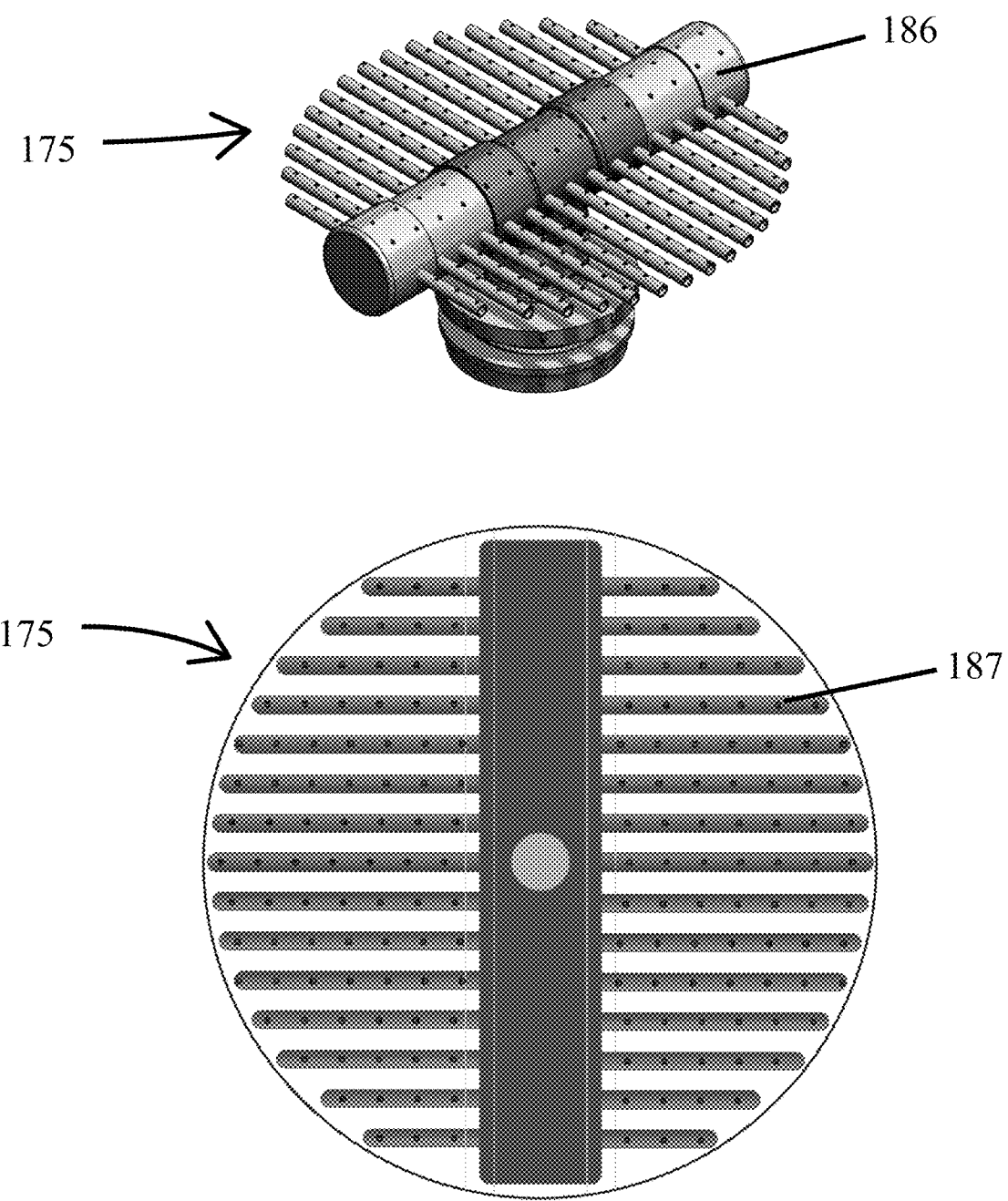
FIG. 10 illustrates a second exemplary gas distributor, according to some aspects of the present disclosure.

Means for distributing 130 (i.e., gas distributors 175) may play an important role in fluidization quality and pressure drop. Examples of typical of gas distributors include perforated or porous plate, bubble caps and nozzles, spargers (laterally or downwardly flow), conical grid, and pierced sheet grids. Perforated plate distributors were selected for the analysis described herein, although other distributor types could have been selected. FIG. 9 illustrates a gas distributor having nozzles with bubble caps. A perforated plate is simple and may be easily implemented. Perforated plates may be used as baffles to form a multilayer (i.e., multizone) fluidized-bed 150 in the PFB HX 111 as described above. In some embodiments of the present disclosure, a bubble caps (185 as shown in FIG. 9) of a gas distributor 175 and/or baffle may penetrate into a layer of solid particles 102 that have collected on the gas distributor 175/baffle, thereby directing the gas 110 directly into the layer of solid particles 102 to promote mixing, fluidization, and/or heat transfer. As shown in FIG. 10, bubble caps 185 may be implemented to cover the tops of the nozzles (referred to herein as a "bubble-cap nozzle") to prevent solid particles 102 from clogging the nozzles. In some embodiments of the present disclosure, a baffle plate may be used as a gas distributor 175 where gas 110 moves up and solid particles 102 fall downward through it (i.e., the solid particles 102 fall through the port 168).

Referring again to FIG. 9, the exemplary gas distributor 175 evaluated in this example included 400 individual nozzles (i.e., bubble caps 185). The nozzles were distributed across the 14.0-m diameter floor of the inner shell, e.g., the fluidized-bed 150 portion of the PFB HX 111. In this example, the nozzles were positioned below a perforated plate to smooth gas 110 flow, among other things. This exemplary gas distributor 175 included four cones (i.e., ports 168) to collect the solid particles 102 that had passed through fluidized-bed 150, in order to funnel them out of the PFB HX 111 through four lock hoppers (190 shown in FIG. 13), which all solid particle 102 removal while maintaining the pressure in the PFB HX 111. The exemplary gas distributor 175 evaluated also had 16 orifices (i.e., holes) punctured through its surface to accommodate cyclone dip-legs (not shown) to provide structural support for the cyclones.

Particle-gas separation is important for cleaning the gas 110 prior to the gas 110 reaching the turbine 103; solid particles 102 entering the turbine 103 shorten the life of the turbine 103 blades. In some embodiments of the present disclosure, solid particle 102 separation from gas 110 may include three stages: gravitational disengagement, impingement separation using a U-beam separator, and/or one or more nozzles 180 (i.e., cyclones). By placing the nozzles 180 within the high-temperature inner shell 155 of the PFB HX 111, the system is greatly simplified by eliminating the need for a separate vessel that contains just the nozzles 180. As a result, the nozzles 180 will be operated at high temperatures, so the design of a nozzle 180 may include refractory materials to withstand the high operating temperatures and abrasive conditions. They nozzle 180 may be supported by the inner shell. FIG. 1C, after the solids have been removed from the gas and exit, the clean gas 110 may then exit the PFB HX 111 through the inner tube of the PIP 170 gas line to be subsequently directed to the turbine 103 for electricity generation. In some embodiments, a second particle filter may be external to the PFB HX 111 and upstream of the turbine 103 to further reduce the solid particle 102 concentration in the gas stream 110 and to protect the turbine 103 from erosion. This filter may be a high temperature ceramic candle filter.

FIG. 10 illustrates a second exemplary gas distributor 175, according to some aspects of the present disclosure. The gas distributor 175 shown in FIG. 10 is a large head pipe 186 with a plurality of manifold pipes 187 extending from the head pipe 186. The example shown in FIG. 10 shows the manifold pipes 187 approximately perpendicular to the head pipe 186, but any orientation of the manifold pipes 187 may be used. In some embodiments, the head pipe 186 may have an outer diameter of approximately 2 inches, an inner diameter of approximately 1.75 inches, and a wall thickness (or pipe thickness) of approximately 1/8 inch. The manifold pipes 186 may have an outer diameter of approximately 5/16 inches, an inner diameter of approximately 0.215 inches, and a wall thickness of approximately 0.049 inches. The example gas distributor 175 in FIG. 10 includes 284 orifices in total on the manifold pipes 187 and head pipe 186. The orifices have a diameter of approximately 3/32 inches. The gaps between the manifold pipes 187 allow the solid particles 102 to flow (or fall) down through the manifold pipes 187 and exit the PFB HX 111.

Figure 11:
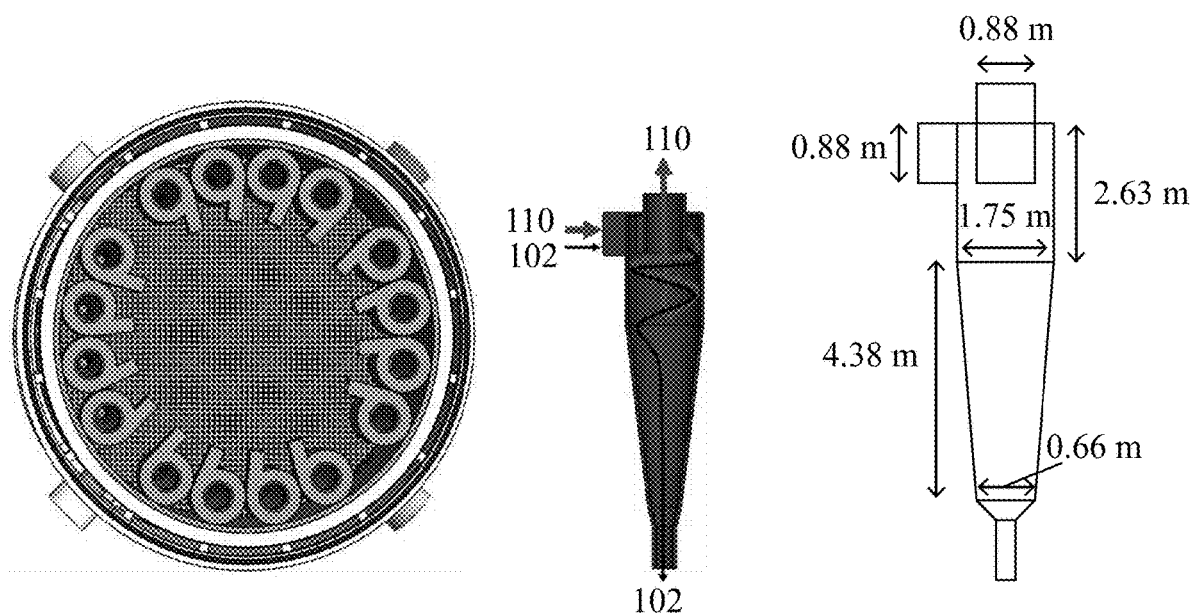
FIG. 11 illustrates a nozzle (i.e., cyclone) design for gas/solid particle separating, according to some embodiments of the present disclosure. The cross-sectional view of the PFB HX, highlighting the position of the 16 cyclones is shown on the left. The general flow of the solid particles and gas within the nozzle is shown in the center and the dimensions used for this exemplary nozzle design is shown on the right.

A total of sixteen (16) nozzles 180 (i.e., cyclones) were included in the exemplary PFB HX 111 described herein. They were all arranged to connect with the refractory layer of the inner shell 155 for structural purposes. As shown in FIG. 11, nozzles 180 may be arranged in four sets of four. In some embodiments of the present disclosure, each set of four may be positioned as close together as possible without physically touching. The incoming hot solid particles 102 are fed into the fluidized-bed 150 through the gaps formed by the sets of four nozzles (180). The gaps are designed to allow unobstructed flow of the solid particles 102 into the fluidized-bed 150. The collected cooled solid particles 102 fall through each nozzle's 180 dip-leg (not shown) to be directed to small slots positioned in each dip-leg and a cone which directs the collected solid particles 102 out of the nozzle 180 and into the solid particle 102 outlet funnels that are incorporated into the gas distributor 175 described above.

Figure 12:
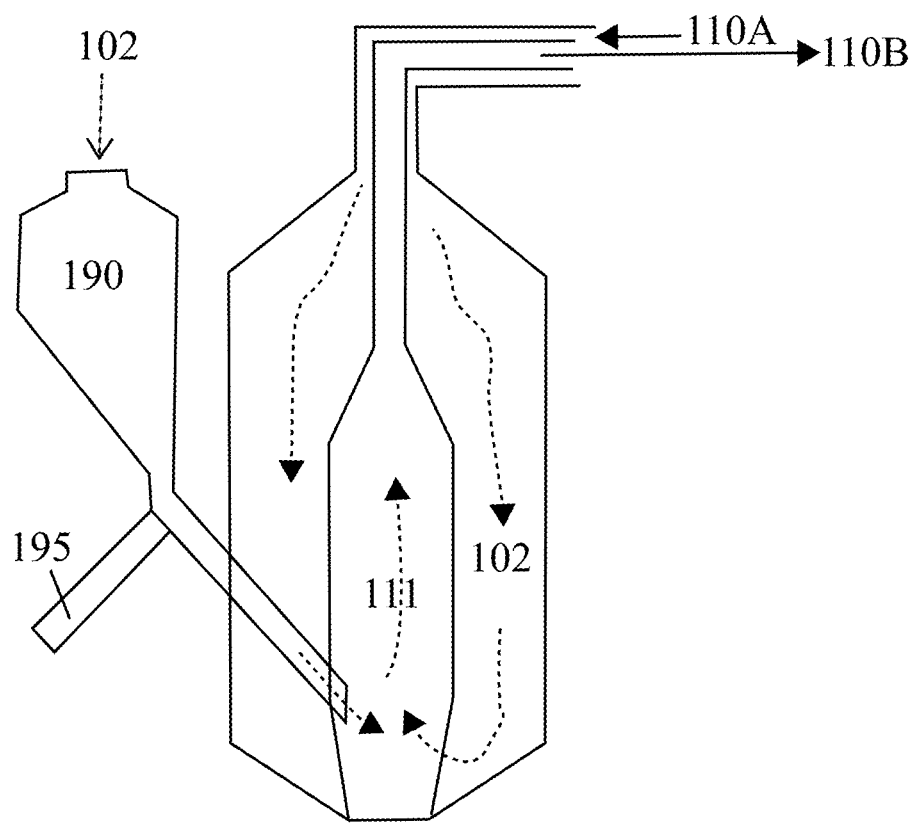
FIG. 12 illustrates a schematic of a particle feeding system to a PFB HX, utilizing a lock hopper, according to some embodiments of the present disclosure.

For reliable transfer of hot solid particles 102 to a PFB HX 111, a lock hopper 190 (as shown in FIG. 12) may be utilized to seal the pressurized gas 110 inside the PFB HX 111 and to enable supplying gas 110 to a turbine 103 for electricity generation. A lock hopper 190 may have two valves: one located on the top of the lock hopper 190 for the gravitational flow of solid particles 102 from a storage silo 101 (not shown in FIG. 12) into the lock hopper 190, and another located at the bottom of the lock hopper 190 for the gravitational flow of particles out of lock hopper 190 and into the PFB HX 111. After solid particles 102 have filled the lock hopper 190 to its capacity, the top valve is closed, pressurized gas 110 enters the lock hopper 190 to pressurize the inside to a same pressure as the PFB HX 111. Then the bottom valve opens to release the solid particles 102 into the PFB HX 111. Thus, the two valves operate together to enable the dispensing of solid particles 102 into the PFB HX 111. Thus, in some embodiments of the present disclosure, at least two lock hoppers 190 may be needed to continuously feed hot solid particles 102 into the PFB HX 111; e.g., while one is filling, a second is feeding. FIG. 12 illustrates a schematic of a solid particle feeding system utilizing a lock hopper 190, according to some embodiments of the present disclosure. Cooled gas 110A enters the PFB HX 111 from the turbine 103 and/or generator 104 and heated gas 110B exits the PFB HX 111.

Thus, a lock hopper 190 operates at two different pressure levels and two corresponding operating conditions; charging, which corresponds to heating solid particles 102 using the particle heater 108, and discharging, which corresponds to cooling the solid particles 102 in the PFB HX 111. During discharge, the solid particles 102 being stored in the silo 101 and dispensed to the PFB HX 111 via a lock hopper 190 are extremely hot (e.g., about 1200° C. or greater). These hot solid particles 102, in some embodiments, may flow by gravity into the PFB HX 111 at rates as high as 300 kg/s, where, as described above, heat is transferred from the solid particles 102 to the gas 110. When in the other condition, when the system charging, the silo 101 is discharging cold solid particles 102 at about 300° C. to a skip hoist 195 to be subsequently lifted and transferred to the particle heater. Thus, because of the two operating conditions, the insulation for the lock hopper 190 positioned at a silo 101's exit should be designed to minimize heat losses when operating at the high temperatures, e.g., about 1200° C. For continuous operation, during discharging, to operate at a flow rate of about 300 kg/s requires the lock hopper 190 to discharge solid particles 102 at this same rate 300 kg/s to the PFB HX 111. Similarly, during charging, the solid particle 102 flow rate may need to be greater than 300 kg/s considering the skip hoist 195 traveling time. To satisfy these variable operating conditions, the lock hopper 190 valves (e.g., gate valves) need to be designed to operate at both the high temperature and the low temperature, e.g., a range between about 300° C. and about 1200° C. In some embodiments of the present disclosure, the lock hopper 190 valves may be adjusted to a specific percent open, to provide finer control of the solid particle 102 flow from the silos 101. The valves may be made of a refractory material. Solid particles 102 exiting a PFB HX 111 through a lock hopper 190 may be redirected back to a silo 101, bypassing the particle heater 108. In some embodiments of the present disclosure, cold solid particles 102 may be positioned for storage on top of hot solid particles 102 in the same silo 101. When charging, the cold solid particles 101 bypass the PFB HX 111 and are transported to the skip hoist 195 for transport to the particle heater 108.

In some embodiments of the present disclosure, the materials of construction for a lock hopper 190 may be selected as follows, from inside to outside: a refractory and internal insulation within a structure steel shell, and external mineral wool for insulation from the ambient. Table 4 shows the metrics for such an exemplary lock hopper 190. For the example system described herein, the locker hopper 190 will operate under pressures of about 1.25 MPa.

TABLE 4

Exemplary lock hopper metrics.

| Specification | Unit | Value |
| --- | --- | --- |
| Lock Hopper Inlet Port Size | m | 0.5 |
| Lock Hopper Outlet Port Size | m | 0.380 |
| Lock Hopper Height | m | 18 |
| Particle Load of Single Lock Hopper | ton | 63.81 |

In some embodiments of the present disclosure, particles may be directed into a PFB HX 111 from a single point positioned in the side wall of the outer shell 160. This flow of solid particles 102 should be distributed evenly across the cross section of inner shell containing the fluidized-bed 150 portion of the PFB HX 111. Among other things, such an even distribution of the solid particles 102 will prevent gas 110 from bypassing the solid particles 102. In the exemplary design described herein, a standpipe (not shown) is used into which the hot solid particles 102 will overflow to then drop through dip-leg pipes (not shown) to drop into the fluidized-bed 150.

As described above, a pipe-in-pipe (PIP) 170 may be used to direct gas 110 to and from a PFB HX 111. One advantage of a PIP 170 design is that it can yield significant savings on the insulation materials. The hot gas flows inside the inner pipe. This inner pipe may be insulated from the cold gas flowing through the annulus between the inner tube and the outer pipe. An insulation layer placed inside the inner pipe can lower the exterior temperature of the inner shell sufficiently to be close to the temperature of the cool gas flowing through the annulus (e.g., about 300° C.). Therefore, conventional steel can be used for both the inner and outer pipes. This PIP 170 gas line configuration also means the inner pipe is subjected to nearly equal pressure between the hot and cold gases 110, thus reducing wall thicknesses and cost. The outer pipe may be insulated to prevent heat loss from the entering gas 110 to the environment. A PIP gas-line 170 design is illustrated in FIG. 13, according to some embodiments of the present disclosure.

The cross section of the PIP gas-line 170 indicates that the high temperature gas 110 flows through the inner pipe, and the low temperature gas through the annular space created by the positioning the inner pipe inside the outer pipe. The two gas 110 flows flow counter-current to one another. In some embodiments of the present disclosure, both inside pipe and outer pipe may be insulated with insulated as shown in FIG. 13. For each gas turbine unit, the connecting pipeline is designed as a pipe bundle to deliver the required amount of gas flow between the power system and the PFB HX 111 within the desired pressure drop. Low-temperature gas 110 from the compressor fed to the annular space helps to cool the outer pipe, thus enabling both pipes to be constructed of carbon steel.

Figure 13:
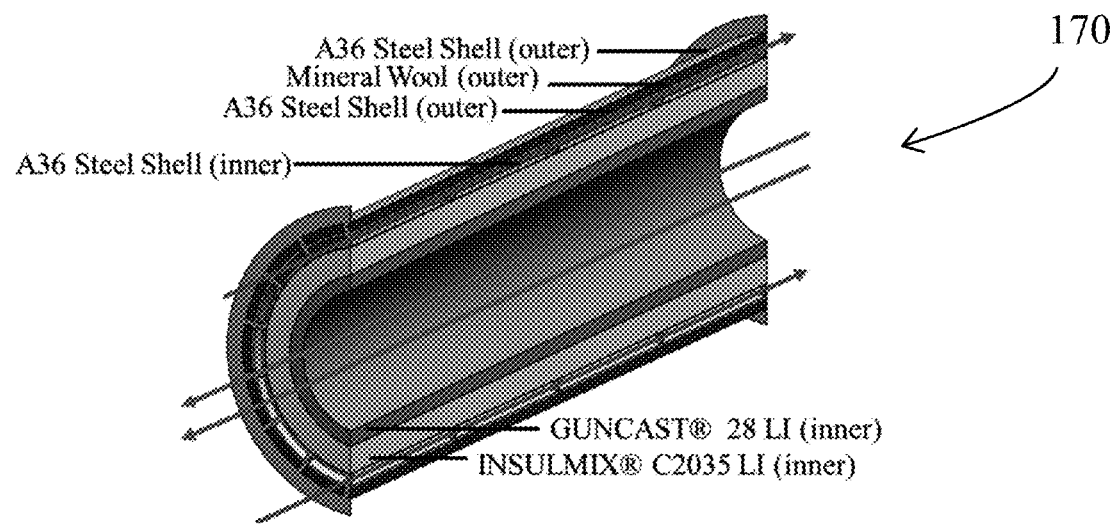
FIG. 13 illustrates a schematic of the pipe-in-pipe gas-line design, according to some embodiments of the present disclosure.

The inner pipe in FIG. 13 may be configured to transport heated gas 110 at a temperature of approximately 1200° C. In the example shown in FIG. 14, the inner pipe may have an inner diameter of approximately 1.650 m and be insulated with GUNCAST® 28 LI in a thickness of about 0.165 m, INSULMIX® C2035 LI in a thickness of about 0.300 m, and an A36 steel shell with a thickness of about 00.08 m (or approximately 5/16 inches). The outer pipe in FIG. 14 may be configured to transport cooled gas 110 at a temperature of approximately 300° C. and/or within the range of about 200° C. to about 600° C. In the example shown in FIG. 14, the outer pipe may have an inner diameter of about 2.850 m, an A36 steel shell of about 0.034 m, and mineral wool of about 0.100 m. In some embodiments, the outer pipe may have an inner diameter in the range of about 0.1 m to about 10 m. In some embodiments, the inner pipe may have an inner diameter in the range of about 0.1 m to about 10 m.

In some embodiments, the heat transfer within the PFB HX 111 may be from heated gas 110 to solid particles 102, which then heats the solid particles 102 and cools the gas 110. This may be for heat gas 110 exiting the turbine 103 to allow for pumped thermal energy storage. In such an embodiment, the heated gas 110 may flow through the outer annulus (i.e., outer pipe) of the PIP gas line 170 and the cooler gas 110 may flow through the interior annulus (i.e., inner pipe) of the PIP gas line 170. The direction of the gas 110 flow may be counter-current to the flow of the solid particles 102.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A heat exchanger configured to transfer thermal energy between a gas stream and a stream of solid particles, the heat exchanger comprising:
   a means for contacting the gas stream with the stream of solid particles resulting in a transfer of thermal energy between the gas stream and the stream of solid particles;
   an outer shell;
   an inner shell; and
   a means for directing the solid particles stream to the means for contacting comprising a port which penetrates the inner shell and outer shell; wherein
   the heat exchanger is configured to gravitationally pass the stream of solid particles through the means for contacting,
   the heat exchanger is configured such that the gas stream flows counter-current to the stream of solid particles, and
   the means for directing is positioned before the means for contacting, relative to the direction of flow of the stream of solid particles through the heat exchanger.

2. The heat exchanger of claim 1, wherein:
   the means for contacting is positioned within the inner shell.

3. The heat exchanger of claim 2, further comprising a gas inlet configured to direct the gas stream to the means for contacting.

4. The heat exchanger of claim 3, further comprising a gas outlet configured to receive the gas stream from the means for contacting.

5. The heat exchanger of claim 4, wherein:
   the gas stream has a temperature, and
   the temperature is substantially greater at the gas outlet than at the gas inlet.

6. The heat exchanger of claim 4, wherein:
   the gas stream has a temperature,
   the temperature is substantially lower at the gas outlet than at the gas inlet.

7. The heat exchanger of claim 4, wherein:
   the gas inlet comprises a first pipe,
   the gas outlet comprises a second pipe,
   the second pipe is positioned concentrically within the first pipe creating a first annular space, and
   the gas stream is configured to flow through the first annular space.

8. The heat exchanger of claim 7, wherein:
   the inner shell is positioned within the outer shell creating a second annular space, and
   the gas stream is configured to flow from the first annular space to the second annular space.

9. The heat exchanger of claim 7, wherein:
   the means for contacting is an empty volume within the inner shell.

10. The heat exchanger of claim 1, further comprising:
    a means for distributing the gas stream through the means for contacting, wherein:
    the means for distributing is positioned before the means for contacting, relative to the direction of flow of the gas stream through the heat exchanger.

11. The heat exchanger of claim 10, wherein:
    the means for distributing comprises a plate having an orifice, and
    the orifice is connected to a bubble cap.

12. The heat exchanger of claim 10, wherein:
    the means for distributing comprises a plurality of pipes having at least one orifice.

13. The heat exchanger of claim 1, wherein:
    the means for contacting results in a portion of the stream of solid particles entrained within the gas stream.

14. The heat exchanger of claim 13, further comprising:
    a means for separating the stream of solid particles from the gas stream.

15. The heat exchanger of claim 14, wherein:
    the means for separating comprises a nozzle having an inlet, a first outlet, and a second outlet,
    the inlet is configured to receive the gas stream and the stream of solid particles,
    the first outlet is configured to release the gas stream from the nozzle, and
    the second outlet is configured to release the gas stream from the nozzle.

16. The heat exchanger of claim 14, wherein:
    the means for separating comprises a filter.

17. The heat exchanger of claim 14, wherein the filter is a mesh filter.

* * * * *